Nov. 15, 1960 P. F. WARNER ET AL 2,960,454
PURIFICATION OF POLYMERS
Filed March 28, 1957
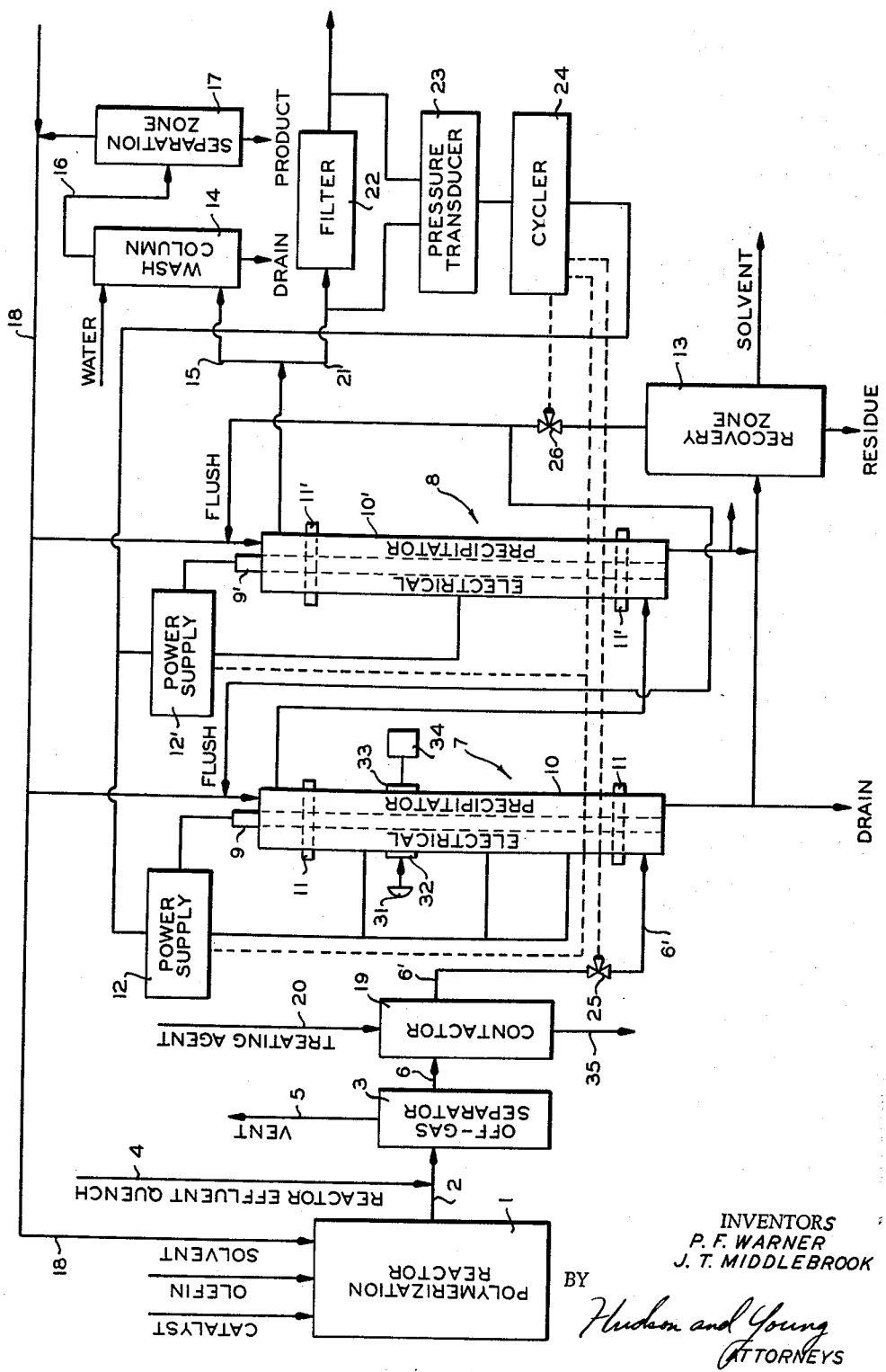
INVENTORS
P. F. WARNER
J. T. MIDDLEBROOK
BY
*Hudson and Young*
ATTORNEYS

United States Patent Office 2,960,454
Patented Nov. 15, 1960

2,960,454

PURIFICATION OF POLYMERS

Paul F. Warner, Phillips, and John T. Middlebrook, Borger, Tex., assignors to Phillips Petroleum Company, a corporation of Delaware Filed Mar. 28, 1957, Ser. No. 649,204

5 Claims. (Cl. 204—186)

This invention relates to the removal of impurities from polymers. In one of its more specific aspects, this invention relates to the removal of gels from solutions of hydrocarbon polymers. In a still more specific aspect, this invention relates to the simultaneous removal of gels and inorganic materials from solutions of olefin polymers.

This application is related to an application of P. F. Warner, Serial No. 643,144, filed February 28, 1957, now abandoned.

The polymerization of butadiene to form liquid polymers of butadiene is well known and a preferred process is disclosed and claimed in U.S. Patent 2,631,175, issued March 10, 1953, to W. W. Crouch. The process as described comprises polymerization of 1,3-butadiene in the presence of an alkali metal catalyst and a suitable polymer solvent or diluent, the reaction being carried out under carefully controlled reaction conditions, particularly temperature, catalyst conditions and concentration, quantity of solvent, and rate of butadiene addition; recovery of the product by some appropriate means such as by treatment with a quantity of water followed by introduction of carbon dioxide to react with the alkali metal and organo-alkali metal compounds and to precipitate alkali metal carbonates, removal of the precipitate, and stripping to separate the diluent from the liquid polymer. When operating according to the process of the above described invention, a liquid polymer of high molecular weight is produced. The polybutadiene thus produced is a substantially colorless transparent liquid.

One of the problems encountered in the production of high molecular weight liquid olefin polymers is that of removing the catalyst used in the polymerization. Gel is sometimes produced in the polymerization and it is desirable to remove this gel at least for certain uses. If the catalyst is removed by gravitational means, i.e., centrifuging, settling, etc. at least a substantial part of the gel remains in suspension. Filtering normally removes both gel and catalyst but if a substantial amount of gel is present, the filter medium plugs almost immediately upon the introduction of the solution, and therefore, the filtering medium cannot be used under these circumstances with any degree of success. Furthermore, filtering is not a satisfactory means of catalyst removal in some polymerization processes such as in the polymerization of butadiene to a high molecular weight liquid polybutadiene in the presence of finely divided alkali metal catalyst.

It is therefore an object of this invention to provide an improved method for the removal of gel from solutions of polymers. It is also an object of this invention to provide an improved method for the removal of catalyst from the polymer produced in a polymerization reaction. A further object of this invention is the provision of a method for the simultaneous removal of gel and catalyst from a solution of a polymer. Other and further advantages and objects of this invention will be apparent to one skilled in the art upon study of the disclosure of the present invention.

Broadly, the invention contemplates the removal of gel from a solution containing the same in admixture with a polymer by subjecting the solution to which a multivalent cation has been added to an electrostatic field whereby the gel is precipitated or agglomerated and is simultaneously or subsequently removed.

Without the use of the multivalent cation, the process is the same as described in the application above-mentioned of P. F. Warner. It has been found in operating the Warner invention that some solutions are difficult to treat using that invention. For instance, some reactor effluents contain so much gel that the simple electrical precipitator treatment is insufficient.

We have discovered that an improvement is obtained by treatment of the reactor effluent, following quenching, with a multivalent cation. We have found improvement with all of the multivalent cations we have tried and the invention is applicable to all of these cations. Salts which can be used include aluminum acetate, aluminum benzoate, aluminum bromide, aluminum ferrocyanide, aluminum nitrate, aluminum oxalate, aluminum sulfate, barium acetate, barium carbonate, barium chlorate, barium chloride, barium formate, beryllium chloride, beryllium oxalate, beryllium sulfate, bismuth acetate, bismuth sulfate, bismuth chloride, cadmium benzoate, cadmium chloroacetate, cadmium formate, cadmium sulfate, cadmium sulfite, calcium carbonate, calcium chlorate, calcium chloride, calcium malonate, calcium nitrite, calcium sulfate, chromium acetate, chromium chloride, chromium nitrate, chromium sulfate, cobalt bromide, cobalt chloride, cobalt sulfate, ferrous acetate, ferric chloride, ferric oxalate, lead acetate, lead nitrate, magnesium acetate, magnesuim benzoate, magnesium chloride, magnesium permanganate, magnesium sulfite, manganese iodide, manganese sulfate, mercuric bromide, mercuric chloride, nickel chlorate, nickel chloride, nickel sulfate, tin bromide, tin chloride, tin sulfate, tin tartrate, titanium tetrachloride, zinc acetate, zinc borate, zinc carbonate, zinc chloride, zinc sulfate, and the like. Complex salts of these metals, such as alum, can also be used.

The drawing is a schematic flow diagram of a preferred embodiment of the invention.

The present invention is particularly applicable to the simultaneous removal of gel and catalyst residue from solutions of high molecular weight polybutadiene in a polymerization process effluent. It is also applicable to the removal of gel from a catalyst-free and solvent-free product. If a solvent-free product is used, it must be of such a molecular weight that the viscosity is sufficiently low to permit migration of the impurity therethrough so as to accomplish agglomeration of the gel particles. In processing high molecular weight liquid polybutadiene (molecular weight—1,000 to 3,000), it is preferred to have the solution contain not more than about 40 to 50 percent polymer. The process is equally applicable to the removal of gel from a quenched reactor effluent during the manufacturing process or from the finished product. In those cases where the gel removal step is used in conjunction with the manufacturing process, it is preferred to install it immediately after the reactor effluent is quenched, because the catalyst residue material is also simultaneously removed and the use of conventional catalyst residue removal equipment is thereby eliminated. The electrostatic field can be used either for agglomeration of the gel particles or for precipitation of the inorganic catalyst residue material, or a combination of the two. Operating conditions can be adjusted so that all of the impurities are deposited on the electrodes or operating conditions can be adjusted so that at least a major portion of the material leaves the electrostatic field in an agglomerated condition so that it can easily be removed by conventional means such as a centrifuge or a coarse filter medium.

The reactor effluent stream is treated so as to quench the reaction by destroying the active catalyst as quickly as possible. Thus, the reactor effluent stream is treated with a suitable material, such as methyl alcohol, so as to convert the alkali metal catalyst to an alkali metal salt, such as sodium methylate (sodium methoxide). Other suitable materials for quenching the reaction by destroying the catalyst include oxygen-containing materials such as low molecular weight alcohols, formic acid, acetic acid, carbon dioxide, and methyl carbitol.

Following the quench step, the metal salt is added, frequently as an aqueous solution. The salt can be added alone or salt solution can be used to wash the effluent from the quench step. Generally, 20 to 500 milliliters of salt solution are added per gallon of reactor effluent, said salt solution containing 5 to 50 grams of the metal salt per gallon. In some cases, it is desired to heat the effluent from the quench step and this can easily be done by heating the material to the reflux temperature. This last step is not essential, however, in the practice of our invention.

It is believed that the impurities referred to as gels result from cross-linking of the polymer produced in the reaction and the reason for quenching the reaction immediately following the reaction vessel is to discourage formation of these materials. An indication of the amount of gel present in a polymer, and consequently, the filterability of the polymer, can be obtained by making a thin film of the polymer and determining the frequency of detectible particles referred to as "fish eyes." The fish eye count does not always reflect the true filterability of the product but does provide an indication of the presence of gels which can affect filterability. In every instance, however, polymer treated according to the present invention has displayed improved filterability characteristics and lower fish eye count as compared to the charge material. Although we do not fully understand the forces which bring about the agglomeration and precipitation of the gel from a polymer solution, we have found that subjecting the polymer solution to which a multivalent cation has been added to an electrostatic field results in a preferential accumulation and separation of cross-linked polymeric material referred to as gel from linear polymers. Furthermore, we have found that a direct-current electrostatic field accomplishes the desired agglomeration whereas an alternating-current does not accomplish the desired selective accumulation. Voltages in the range of 800 to 33,000, based on one inch electrode spacing, can be used for gel and catalyst removal.

The attached drawing illustrates one embodiment of the invention, however, it will be obvious to those skilled in the art and in possession of the disclosure that numerous other embodiments are within the scope of the invention. The process described in connection with the drawing relates to the polymerization of butadiene to a viscous liquid in the presence of a finely divided metallic sodium catalyst and a normal heptane diluent, but the description of the embodiment should not be considered as limiting the invention. It will be understood that various valves, pumps, and other equipment inherently necessary in the operation of the process will not be illustrated because it is within the skill of one acquainted with this art to provide such necessary auxiliary equipment.

A butadiene polymerization reaction such as that described in U.S. 2,631,175 is conducted in reactor 1 and the effluent from the reactor is passed through a conduit 2 to separator 3 together with a stoichiometric excess of quench material, such as alcohol, added to the reactor effluent via conduit 4 so as to convert all of the sodium catalyst to sodium methylate. Normally, only non-condensible gases such as hydrogen are vented from the separator 3 via conduit 5; however, if desired, any excess of alcohol and even a portion of the normal heptane diluent can also be removed via conduit 5. The resulting polymer solution is passed via conduit 6 to contactor 19 to which the treating agent is supplied via conduit 20. Excess treating agent, if used, can be removed through conduit 35, if desired. The effluent from contactor 19 is passed via conduit 6' to a two-stage electrical precipitator comprising stages 7 and 8. The precipitators comprise center electrodes 9 and 9', annular electrodes 10 and 10', insulators 11 and 11', and power supply means 12 and 12'. In the embodiment shown, two sections are illustrated, but any number, including one, can be used if desired. In the embodiment shown, the first section or stage is operated principally as an emulsion breaking apparatus wherein a voltage gradient in the range 1100 to 8800 volts is used. The term "voltage gradient" is used to denote the voltage used where the electrode spacing is one inch. Thus, a voltage of 1000 volts for 0.5 inch spacing would be equivalent to a voltage of 2000 volts for 1 inch spacing. The permissible voltage in the first stages of precipitation is normally limited due to the conductivity of the solution. After a substantial portion of the electrically conductive materials have been removed, a voltage gradient in the range 11,000 to 28,000 can be used satisfactorily. Direct current is used and both gel and catalyst deposit on the negative electrode or at least migrate toward the negative electrodes. When the electrodes have deposited thereon a substantial amount of gel and catalyst, the current is shut off and the precipitators are then flushed with a suitable material. This material is preferably the same as the polymer solvent but other flush materials can be used when desired. It is also within the scope of the invention to reverse the flow of current during the washing step but it is preferred to shut off the current entirely. The flush material leaving the precipitators can either be discarded or passed to a suitable recovery zone 13.

The optimum time for shutting off the current and flushing the precipitators with wash material can be determined by various means. Thus, a sample stream 21 can be diverted from product line 15 and continually passed through a filter medium 22. When the effectiveness of the precipitators begins to decrease as a result of material deposited on the electrodes, the increased back pressure created in the filter medium can be converted to a signal by pressure transducer 23 to operate automatic cycler 24 so as to shut off the current to the precipitators to close valve 25 stopping the feed of polymer to the precipitators and to open valve 26 so as to start a flow of flush material to wash the electrodes of the precipitators; after which the flow of the wash material is discontinued, potential is again applied to the precipitators and the flow of polymer solution is resumed. Another method of determining the saturation point of the precipitators is to direct a beam of radiation through the precipitators to a detector, such as an "electric eye," so that an interruption in the beam of radiation caused by accumulation of gel and catalyst will initiate operation of the automatic cycler. Thus, radiation can be caused to pass from source 31 through sight glasses 32 and 33 to detector 34.

The polymer solution leaving the precipitators via conduit 15 is now essentially gel free and catalyst free and is passed to a water wash vessel 14. The water washed solution is then passed via line 16 to separation zone 17, wherein the product is recovered essentially solvent-free and the solvent is recovered and all or a portion of it is recycled to reactor 1 via conduit 18.

The following specific examples further illustrate the advantages of the process of this invention.

EXAMPLE I

A series of runs were made to demonstrate the improvement obtained by the practice of our invention. The apparatus was substantially that as shown in the single figure using electrodes 10 and 10' of stainless steel tubing having an outside diameter of one inch and ⅜-inch copper tubing for electrodes 9 and 9'. Direct current voltages were applied between the electrodes of 800 and 5000 volts, the voltage being applied in each case being shown in the accompanying table. In each run, the electrode spacing was 0.34 inch. The data for these runs are shown in Table I.

*Table I*

| Run | Pretreatment | Charge Fish eyes per sq. in. | Ash | First Stage | | Second Stage | | Effluent | | Salt | Amount, grams per gallon | Percent Fish eyes Removed |
|---|---|---|---|---|---|---|---|---|---|---|---|---|
| | | | | Volts | Microamp. | Volts | Microamp. | Fish eyes per sq. in. | Ash, Wt. Percent | | | |
| 1 | Plant off gas separator effluent (Reactor effluent killed with methanol). | 100 | 4.0+ | 800 | 500–4,000 | 5,000 | 250 | 10 | 0.03 | | | 90.0 |
| 2 | Reactor effluent quenched with excess methanol and refluxed several hours. | 400 | 2.0+ | 800 | 100–200 | 5,000 | 250 | 92 | 0.067 | | | 77.0 |
| 3 | Off gas separator effluent treated with 100 ml. methanol, 100 ml. water and salt. | 100 | 4.0+ | 5,000 | 250 | 5,000 | 250 | 1 | 0.007 | AlCl₃.6H₂O | 20 | 99.0 |
| 4 | Reactor effluent quenched with methanol 50 ml./gal. Refluxed with 100 ml. methanol+salt. | 400 | 2.0+ | 800 | 4 | 5,000 | 250 | 1¼ | 0.077 | AlCl₃.6H₂O | 20 | 99.75 |

Examination of this table demonstrates the improvement obtainable by the practice of our invention. Runs 1 and 3 were carried out on the same feed material, aluminum chloride in aqueous solution being added to run 3 and runs 2 and 4 are run on the same feed material with aqueous aluminum chloride solution being added in run 4. Practically complete removal of fish eyes was obtained in runs 3 and 4 whereas, when no salt was used, only 77 percent and 90 percent removal was obtained. In these runs, the reactor effluent was about 50 weight percent liquid polybutadiene in normal heptane. The liquid polybutadiene was prepared by sodium catalyzed polymerization according to the method of Crouch, 2,631,175. The solution after treatment with the salt was fed to the precipitator at approximately 200 milliliters per hour.

EXAMPLE II

Using another run, the material following the quench step was washed with water saturated with aluminum chloride. A product having 1.2 fish eyes per square inch was obtained.

EXAMPLE III

Using the material of Example II, a wash step was used wherein a saturated solution of aluminum sulfate was used. The product after the two-stage precipitator treatment contained less than one fish eye per square inch.

Examination of these examples shows that products with a large number of fish eyes can be satisfactorily treated by our invention. While a good product can be improved, it is believed that the invention will find its greatest use where the product from the quench step contains a considerable number of fish eyes where a satisfactory product is difficult to obtain without the addition of salt. More specifically, we believe our invention will have its greatest utility wherein the product from the reactor effluent has over 75 fish eyes per square inch or where the simple electrical treatment will not provide a product having less than 5 fish eyes per square inch. From Example II, it will be seen that a considerable improvement is obtained and, in all cases, wherein salt was added, over 90 percent of the fish eyes have been removed and usually over 97 percent of the fish eyes can be removed by the process of our invention.

Although the invention is described as specifically directed to the removal of gel or cross-linked polymer from a linear polymer of butadiene it is also applicable to the separation of cross-linked polymer from other linear polymers, such as a solution of solid polyethylene produced in the presence of a chromium oxide catalyst. A process for producing solid, linear polymers of ethylene is described in copending application Serial Number 573,877, filed March 26, 1956.

The invention is also applicable to the removal of gel from synthetic rubber, such as butadiene/styrene copolymers. In the removal of gel from rubber the preferred method is to dissolve the dried crumb rubber in a suitable solvent, such as benzene or toluene and to pass the solution through the precipitators so as to separate and remove the gel. The precipitator effluent is then flash distilled to remove the solvent and recover the gel-free rubber.

As many possible embodiments can be made from this invention without departing from the scope thereof, it is to be understood that all matter herein set forth is to be interpreted as illustrative and not as unduly limiting the invention.

We claim:

1. In the process for producing polybutadiene wherein 1,3-butadiene is polymerized in a polymerization zone in an inert solvent for the polybutadiene and wherein gels insoluble in said solvent are produced as a byproduct of said polymerization, the improvement which comprises withdrawing from said polymerization zone a mixture of said solvent and gel, adding a salt containing a multivalent cation to the mixture in an amount of 0.026 to 6.6 grams of said salt per gallon of solution; passing said mixture into the influence of a direct current electrostatic field in the range of 800 to 33,000 volts per inch of electrode spacing, recovering polybutadiene in solution in said solvent as the effluent from said electrostatic field as a product of the process, removing the charge from the electrodes and flushing precipitated gel from the electrodes.

2. In the process for producing polybutadiene wherein 1,3-butadiene is polymerized in a polymerization zone in inert solvent for the polybutadiene and wherein gels insoluble in said solvent are produced as a byproduct of said polymerization, the improvement which comprises withdrawing from said polymerization zone a mixture of said solvent containing polybutadiene and gel, adding a salt containing a multivalent cation to the mixture in an amount of 0.026 to 6.6 grams of salt per gallon of solution, passing said mixture into the influence of a first direct current electrostatic field in the range of 1100 to 8800 volts per inch electrode spacing, passing the effluent from the first electrostatic treatment into the influence of a second direct current electrostatic field in the range of 11,000 to 28,000 volts per inch electrode spacing, recovering polybutadiene in solution in said solvent as the effluent from said second electrostatic field as a product of the process, removing the charge from the electrodes and flushing precipitated gel from the electrodes.

3. In the process for producing polybutadiene wherein 1,3-butadiene is polymerized in a polymerization zone in the presence of a finely divided alkali metal catalyst and an inert solvent for the polybutadiene and wherein gels insoluble in said solvent are produced as a byproduct of said polymerization, the improvement which comprises withdrawing from said polymerization zone a mixture of said solvent containing polybutadiene dissolved therein, gel, and catalyst, adding a salt containing a multivalent cation to the mixture in an amount of 0.026 to 6.6 grams of said salt per gallon of solution, passing said mixture into the influence of a first electrostatic field in the range of 1100 to 8800 volts per inch electrode spacing, passing the effluent from the first electrostatic treatment into the influence of a second direct current electrostatic field in the range of 11,000 to 28,000 volts per inch electrode space, recovering polybutadiene dissolved in said solvent as the effluent from said second electrostatic field as a product of the process, removing the charge from the electrodes and flushing precipitated gel and catalyst from the electrodes.

4. The process of claim 3 wherein said salt is aluminum sulfate.

5. The process of claim 3 wherein said salt is aluminum chloride.

References Cited in the file of this patent

UNITED STATES PATENTS

| | | |
|---|---|---|
| 1,591,472 | De Brey | July 6, 1926 |
| 1,990,213 | Winkler et al. | Feb. 5, 1935 |
| 2,086,666 | Fisher | July 13, 1937 |
| 2,130,789 | Campbell | Sept. 30, 1938 |
| 2,247,065 | Pauli et al. | June 24, 1941 |
| 2,463,610 | Glassmire et al. | Mar. 8, 1949 |
| 2,485,335 | Tyson | Oct. 18, 1949 |
| 2,825,686 | Greene et al. | Mar. 4, 1958 |